United States Patent
Damvig et al.

(10) Patent No.: US 8,352,059 B2
(45) Date of Patent: Jan. 8, 2013

(54) METHOD FOR THE MANUFACTURING OF A REPRODUCTION OF AN ENCAPSULATED HEAD OF A FOETUS AND OBJECTS OBTAINED BY THE METHOD

(75) Inventors: Susanne Damvig, Ishøj Landsby (DK); Jesper Damvig, Solrød Strand (DK)

(73) Assignee: Damvig Develop Future ApS, Taastrup (DK)

( * ) Notice: Subject to any disclaimer, the term of this patent is extended or adjusted under 35 U.S.C. 154(b) by 542 days.

(21) Appl. No.: 12/594,535

(22) PCT Filed: Apr. 19, 2007

(86) PCT No.: PCT/IB2007/051421
§ 371 (c)(1),
(2), (4) Date: Oct. 2, 2009

(87) PCT Pub. No.: WO2008/129360
PCT Pub. Date: Oct. 30, 2008

(65) Prior Publication Data
US 2010/0082147 A1    Apr. 1, 2010

(51) Int. Cl.
*G06F 19/00* (2006.01)
(52) U.S. Cl. ............ 700/118; 600/443; 382/154
(58) Field of Classification Search .......... 700/98, 700/118, 119, 163, 182; 345/419, 420, 458, 345/653, 664; 600/443
See application file for complete search history.

(56) References Cited

U.S. PATENT DOCUMENTS

| 4,821,200 A | 4/1989 | Öberg | 364/474.24 |
| 5,655,535 A * | 8/1997 | Friemel et al. | 600/443 |
| 5,741,215 A | 4/1998 | D'Urso | 600/407 |
| 5,768,134 A | 6/1998 | Swaelens et al. | 364/468.28 |
| 6,434,260 B1 * | 8/2002 | Soferman et al. | 382/131 |
| 6,464,639 B1 * | 10/2002 | Kim et al. | 600/443 |

(Continued)

FOREIGN PATENT DOCUMENTS
WO   WO 99/59106   11/1999

OTHER PUBLICATIONS

Thomas R. Nelson and Michael J. Bailey, "Solid object visualization of 3D ultrasound data", Proc. SPIE 3982, 26 (2000).*

(Continued)

*Primary Examiner* — Dave Robertson
(74) *Attorney, Agent, or Firm* — Winston & Strawn LLP

(57) ABSTRACT

A method for manufacturing a reproduction of a three-dimensional physical object by obtaining a digital two-dimensional representation of the object, manipulating the two-dimensional representation to input-data for a manufacturing machine, and manufacturing a reproduction of a three-dimensional physical object based on the input-data. The method can include selecting a three-dimensional object which is encapsulated, designating a predefined digital three-dimensional representation that resembles the encapsulated three-dimensional physical object, placing the predefined digital three-dimensional model in the background of the manipulated two-dimensional representation, scaling and modifying the predefined digital three-dimensional representation in accordance with the two-dimensional representation, combining the predefined digital three-dimensional representation with the manipulated two-dimensional representation to a full three-dimensional digital representation, converting the full three-dimensional representation to input-data for a manufacturing machine, and on basis of the input data reproducing the encapsulated three-dimensional object as a physical three-dimensional model.

10 Claims, 2 Drawing Sheets

U.S. PATENT DOCUMENTS

| | | | |
|---|---|---|---|
| 6,575,907 B1 * | 6/2003 | Soferman et al. | 600/438 |
| 6,920,414 B2 | 7/2005 | Tøpholm | 703/1 |
| 6,932,842 B1 | 8/2005 | Litschko et al. | 623/16.11 |
| 6,991,605 B2 * | 1/2006 | Lim | 600/443 |
| 7,167,188 B2 * | 1/2007 | Redert | 345/660 |
| 7,835,568 B2 * | 11/2010 | Park et al. | 382/154 |
| 2002/0123817 A1 | 9/2002 | Clasbrummel et al. | 700/118 |
| 2002/0138237 A1 | 9/2002 | Tøpholm | 703/1 |
| 2003/0160786 A1 * | 8/2003 | Johnson | 345/419 |
| 2005/0004451 A1 | 1/2005 | Vilsmeier et al. | 600/426 |
| 2009/0054778 A1 * | 2/2009 | Pagoulatos et al. | 600/443 |
| 2009/0067707 A1 * | 3/2009 | Sim et al. | 382/154 |
| 2009/0169057 A1 * | 7/2009 | Wu et al. | 382/106 |
| 2011/0181590 A1 * | 7/2011 | Brabec | 345/424 |

OTHER PUBLICATIONS

La Torre et al., "The Fetouch Project," Proc. Int"l Conf. Robotics & Automation (ICRA), IEEE CS Press, 2003, pp. 1259-1263.*
International Search Report, PCT/IB2007/051421, mailed Mar. 4, 2008.

* cited by examiner

METHOD FOR THE MANUFACTURING OF A REPRODUCTION OF AN ENCAPSULATED HEAD OF A FOETUS AND OBJECTS OBTAINED BY THE METHOD This application is a 371 filing of International Patent Application PCT/IB2007/051421 filed Apr. 19, 2007.

BACKGROUND

The present invention relates to a method for the manufacturing of a reproduction of a three-dimensional physical object, in particular, a head of a foetus, where the method comprises the steps of obtaining at least one digital at least two-dimensional representation of the object, manipulation of said at least two-dimensional representation to input-data for a manufacturing machine and manufacturing of a reproduction of the head of a foetus based on said input-data.

In the recent years an increasing number of machines have become available in order to produce three-dimensional physical objects from digital representations.

Such digital representations could be obtained using various methods. Currently, the most common is to draw the object to be produced in a three-dimensional (3D) Computer Aided Design (CAD) program. Also, it is possible to have the object represented by two-dimensional (2D) construction drawings, on basis of which an execution program defining the machine coordinates is created that is specifically adapted for the machine on which the object should be manufactured. This implies that the object geometry is fully known and the geometry is sufficiently understandable for the operator to program the machine.

Along with the still increasing capabilities of the machines, the objects to be produced could have an increasing complex geometry. Therefore, an increasing number of machines are capable of directly converting the 3D CAD drawing to coordinates understandable by the manufacturing machine. Thereby, it is achieved that complex geometrical constructions could be produced although they are difficult to describe mathematically. An example of such methods for producing a geometrical construction from a three-dimensional CAD-drawing is rapid prototyping and/or rapid manufacturing.

Typically, the definition of a rapid prototyping process is, that it takes virtual designs from computer aided design or animation modelling software, transforming them into e.g. cross sections, still virtual, and then creates each cross section in physical space, one after the next until the model is finished. In the matter of rapid manufacturing the process is the same using a process material more resistible to more tear and wear.

Therefore, in the field of rapid prototyping and rapid manufacturing it is especially beneficial to be able to convert the digital representation of the desired object directly to understandable execution code for the manufacturing facility. Such manufacturing facilities could e.g. be Stereo Lithography (SLA), Selective Laser Sintering (SLS) or Selective Laser Melting (SLM).

In case the object to be produced is a reproduction of an existing physical object with an unknown geometry the digital representation is created on basis of measuring of the object. If the geometry of the object is complex, it may even be necessary to use a 3D-coordinate measuring machine. For obvious reasons are not all points on the object measured. Critical points are measured and curves are interpolated in order to achieve a full mathematical description of the geometry. However, the use of e.g. a 3D coordinate measuring machine or other forms of contact measuring instruments are not possible if the object in question is encapsulated and cannot be physically accessed.

Within the scope of the present invention an encapsulated head of a foetus is a head of a foetus which cannot be touched by the bare hand nor be seen by the naked eye. This means that the head of the foetus is surrounded on all sides.

This may be the case for objects that are encapsulated in a human body, such as organs, implants, a foetus or other physical objects in the human body. In order to perform physical measurements of the size, shape or physical structure of objects encapsulated in the human body, invasive procedures may be necessary. A number of different non-invasive and non-contact methods have been developed for obtaining a representation of a part of the human body or an object in the human body, such as X-ray, Magnetic Resonance Imaging (MRI) scans, Computed Tomography (CT) scans, Position Emission Tomography (PET) scans, Ultrasound and similar methods. The use of any of these non-contact methods, enable the viewing of or measurements of physical objects that are encapsulated in the human body.

Typically, the output of the above-mentioned non-invasive methods is in the form of a 2D representation of the 3D object, such as an X-ray radiograph, a CT or MRI slice or a ultrasound screenshot. As a simple 2D representation of a 3D object is not sufficient to describe the 3D object as a 3D CAD drawing, there is a need for a method for obtaining a digital representation of an encapsulated object and reproducing this object as a 3D physical model.

U.S. patent application Ser. No. 09/839,222 describes a method for obtaining a digital data representation of the auditory canal in order to be able to customize the shell of a hearing aid to a specific ear. The shape of an impression of an auditory canal is digitalized in order to produce a shell for a hearing aid that follows the contours of the auditory canal. This method only lists the steps to be followed if the impression is fully exposed, in order for the access of the measuring means to see it. Most of the non-contact methods for measuring the impression are considered directly harmful for human tissue or organs and therefore only used when necessary for treatment purposes.

U.S. Pat. No. 4,821,200 describes a method for reproducing the shape of a stump of a human extremity. The method and the apparatus is highly adapted to measure and reproduce said stump. The measuring is carried out using video cameras, which means that the method is not suited for measurement of encapsulated objects, such as object within the human body. The measurements of the external surface of a human extremity stump, an amputated leg or the like, are performed for the reproduction of the stump in order to facilitate the manufacturing of an improved prosthetic socket, because a moulding cast, which is normally used, would deform the soft biological tissue being moulded.

SUMMARY OF THE INVENTION

It is a first aspect of the present invention to provide a simple and effective method for creating a physical 3D model of a head of the foetus from a two-dimensional representation, such as a picture.

It is a second aspect of the present invention to provide a method for creating a physical three-dimensional model of a head of the foetus within a human body using a non-invasive process.

It is a third aspect of the present invention to provide a fast method for creating a physical 3D model of a head of the foetus from a 2D picture or representation of which the 2D pictures are obtained from a head of the foetus only visible by ultrasound, X-ray or similar tissue penetrating visualization means.

It is a fourth aspect of the present invention to provide a method for creating a physical 3D model of an encapsulated head of the foetus that only requires inexpensive means for obtaining a 2D picture of the encapsulated head of the foetus.

It is a fifth aspect of the present invention to provide a method for creating a physical 3D model of a head of the foetus that has been digitally represented by non-contact measuring means.

It is a sixth aspect of the present invention to provide a method for creating a physical 3D model from a 2D image that is obtained by conventional equipment, such as a digital camera.

It is a seventh aspect of the present invention to provide a method for creating a physical three-dimensional model that results in a more accurate physical reproduction than hitherto known.

Within the scope of the present invention, the reference to the act of manipulating a two-dimensional representation and/or a three-dimensional representation is understood as performed by a human operator using a three-dimensional computer environment provided by a three-dimensional computer aided design program.

Within the scope of the present invention, it is understood that the point of view in the three-dimensional environment is along an axis that is a normal to the face of the two-dimensional representation, such that the terms "behind", "in front of" and/or "in the background of" are relative to the two-dimensional representation along said axis.

The novel and unique whereby this is achieved according to the present invention is by presenting a method comprising the steps of obtaining at least one digital two-dimensional representation of the foetus head, manipulating the two-dimensional representation, where the manipulation comprises deriving of depth parameters from the two-dimensional representation, selecting a head of a foetus which is encapsulated, designating a predefined digital three-dimensional representation that resembles the encapsulated foetus head, placing the predefined digital three-dimensional representation in the background of the manipulated two-dimensional representation, scaling and modifying the predefined digital three-dimensional representation in accordance with the two-dimensional representation, combining the scaled predefined digital three-dimensional representation with the manipulated two-dimensional representation to a full three-dimensional digital representation, converting the full three-dimensional representation to input-data for a manufacturing machine, and on basis of the input data manufacturing of a reproduction of the encapsulated foetus head as a physical three-dimensional model.

When designating a three-dimensional model it is obviously necessary to have an indication or prior knowledge of the object of interest. Often the general shape of the object is known because the reproduction is aimed at reproducing a predetermined object. However, within the scope of the present method, it is possible first to obtain a two-dimensional representation to establish knowledge of the nature, e.g. type or shape, of the encapsulated head of the foetus and thereafter choosing the closest three-dimensional representation from a computer database in order to choose a specific three-dimensional representation of the object in question. Hence, the predefined digital three-dimensional representation is selected as the digital three-dimensional representation which, based on experience, knowledge and expectation, can be determined as the representation, which is closest to the expected visualisation of the final structure of the encapsulated head of the foetus.

By acquiring at least a two dimensional digital representation of the encapsulated head of the foetus and subsequently manipulating said representation, for the purpose of physically reproducing the foetus head in three dimensions, the physical reproduction may be available within a short time period (it is possible to achieve this physical reproduced model shortly) after the digital representation was obtained.

The manipulation of the digital representation could e.g. be enhancing the contrast and/or adjusting the brightness (of the two dimensional digital representation) and thereby obtaining a relative indication of depth. If the image acquired has a black ground colour an area in the image that are furthest away would be black or very dark, while pixels that defines an area on the object that are closer would appear brighter. Such an interpretation which is based on a two dimensional image, where the contrast or brightness is used to indicate the depth of pixels creates a representation that in some cases is called a two and a half dimensional view.

The combination of the predefined three-dimensional representation and the acquired at least two-dimensional image provides the advantage that the focus of the operator, performing the manipulation, is aimed at object parts of particular interest. Advantageously, the predefined representation needs only to be scaled and therefore, the operator has time to put more effort in specific details.

Since a large part of the full three-dimensional representation is obtained directly from a computer database of anatomical models, it is possible to use tools with a highly specialized scope for manipulating e.g. protruding shapes and/or depressions on the object to a desired high level of detail. In most situations these extremities etc. would not be of interest as single individual reproductions and therefore the extremities etc. must be set in the relation to the three-dimensional representation obtained from the computer database.

Furthermore, the use of predefined models from a computer database could advantageously directly provide the necessary information that may not be present from the at least two-dimensional image. E.g. a reproduction of a ball-shaped object would necessitate a series of two-dimensional representation in order to fully describe the object if in fact a full representation is at all possible to obtain. However, if a large part of the object is only of minor interest, but still necessary in relation to the manufacturing process itself, it may not be necessary to spend vital and costly hours in obtaining additional two dimensional representations in order to obtain the full three dimensional representation. Moreover, even if a default backside of e.g. a ball shaped object would be automatically generated it could disturb the visual impression of the manufactured physical three-dimensional object.

Advantageously, the head of the foetus to be reproduced may be reproduced without first creating an initial model of the object.

When the foetus head to be reproduced is manufactured directly from a full three-dimensional representation obtained by the method described in the present invention it is not necessary to create e.g. negative physical model or a moulding on basis of which the reproduction is carried out.

If the foetus head to be reproduced is encapsulated in a human body, a limited number of possible approaches for obtaining the shape and size of the foetus head are practically applicable. This is especially due to the desire of using non-invasive methods because this strongly minimizes the risks of supervening complications e.g. the risk of infections. Therefore, non-invasive methods are always preferred if such alternative is possible. Thus, it is an advantage that a simple two-dimensional representation, obtained using methods such as 2D or 3D ultrasound, MRI, CT, X-ray or similar methods, followed by the manipulation of the representation could serve as basis for physically reproducing the object in question. Most advantageous is the use of methods generally considered safe for humans, such as 2D or 3D ultrasound or MRI, preferred, as these imaging methods are considered harmless while the radiation caused by CT or X-ray may be harmful.

Even at an early stage a foetus may have the lineament of its parents. Therefore, it is a simple matter to determine the most typical features of e.g. the face of the foetus, using non-invasive imaging methods such as 3D ultrasound. It is well known that the population of the world could be grouped into pools that hold similar physical features e.g. Asians, Africans or Aryan. Upon an efficient manipulation of the digital representation of the foetus it is likely that dissimilarities of the different population pools could be part of an automatic process identifying the pool the foetus most likely belongs to. This information may then be used to choose the optimal digital three-dimensional representation that may be placed in the background for combining with an obtained two-dimensional representation as described above.

This means that foetus heads can be reproduced after having obtained the digital representation in a non-invasive manner. Since the general shape is known, the person manipulating the digital representation has the opportunity to focus on the specific shapes or forms of interest.

Advantageously, the manufacturing of the foetus head carried out by a rapid manufacturing or rapid prototyping process.

Using rapid prototyping or rapid manufacturing processes the time period, from the instant of achieving the full three dimensional representation of the object to the instant where the physical object is manufactured, is minimized. When manufacturing a reproduction in order to enable the study of the object in detail, rapid prototyping or rapid manufacturing is a preferred process. Compared to e.g. a Computer Numerical Control (CNC) machine this way of producing the reproduction results in a minimum use of construction material, combined with a high production speed and a high level of detail.

The digital 2D images obtained from e.g. an ultrasound scan are often of such quality that they need to be cleaned for impurities in order to enhance the appearance of the object of which a reproduction is desired.

Advantageously the two-dimensional representation is obtained using ultra-sound, CT, MRI or X-ray.

If a foetus head encapsulated in a human body is to be reproduced it is of importance that the body is subjected to no harm. The ultra-sound, CT, MRI or X-ray systems for obtaining visualizations through human tissue or bones are all considered to be safe and they are all commonly used in the general health care industry. Thus, the operators are familiar with the equipment and the equipment is already commonly available in both public and private sectors. Obviously, the health care industry are subjected to severe approval procedures and it is therefore an advantage of the method of the present invention that already approved equipment are used.

In a preferred embodiment of the present invention the two-dimensional representation could be in the form of a physical illustration, image, photograph, or printout of a screenshot.

If, by the time of obtaining the representation of the foetus head to be reproduced, it is not possible to obtain said representation in digital form, the present method even provides the opportunity to use a physical representation. In this case the physical representation could be converted to a digital representation e.g. by scanning the representation, manipulating said representation and then the reproduction is possible.

The reproductions of the head of a foetus obtained using the method of the present invention exhibit an extremely high level of detail and can therefore be used for reproducing a head of a foetus.

BRIEF DESCRIPTION OF THE DRAWINGS

The invention will now be described by way of example only with reference to the drawing, in which.

DETAILED DESCRIPTION OF THE INVENTION

The invention is described below by way of example with the assumption that the object to be reproduced is a head of a foetus.

Figure 1:
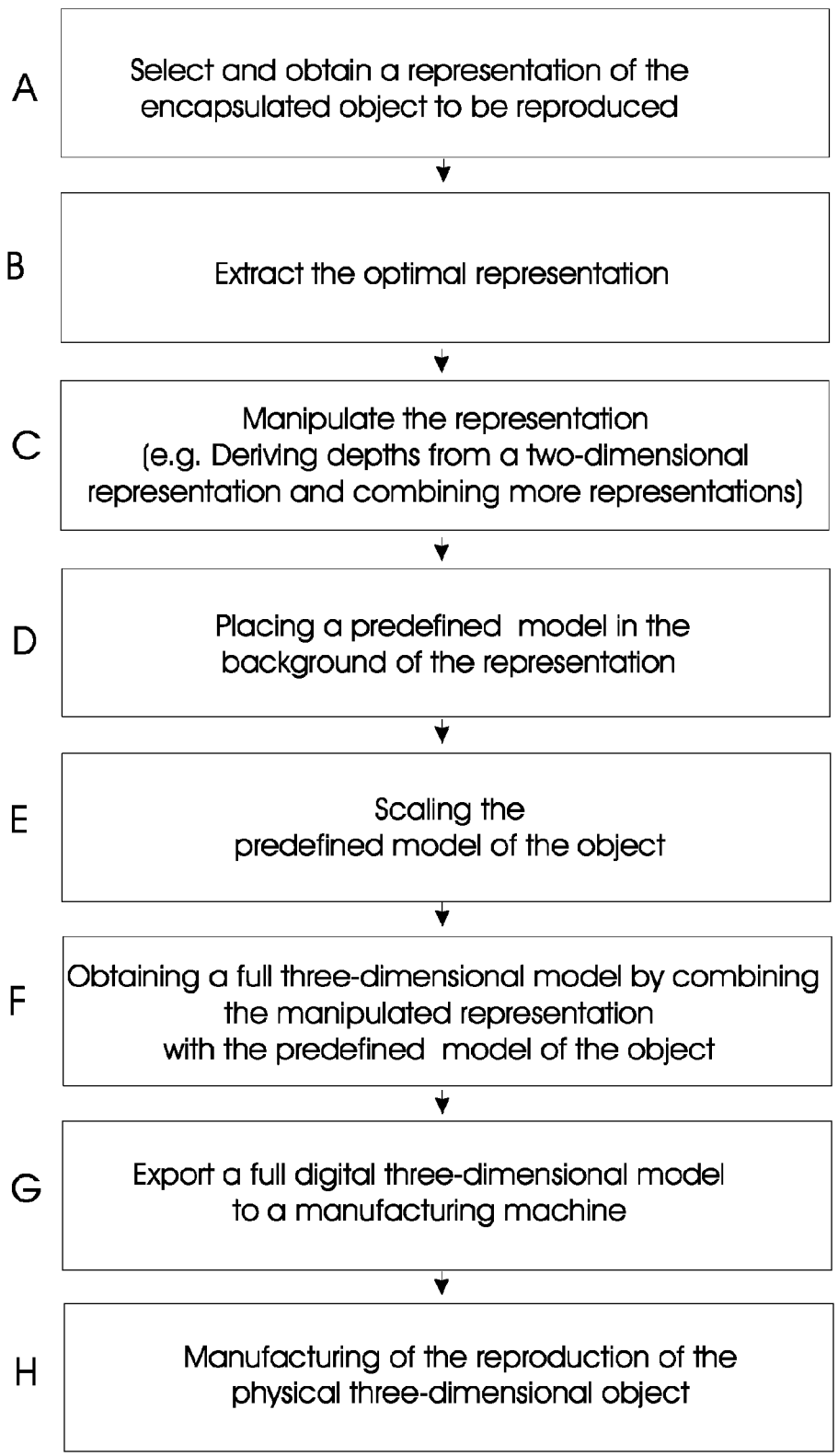
FIG. 1 shows in a diagrammatic view an extract of general steps of a preferred method according to the present invention.

FIG. 1 shows the general steps A-H of the method of reproducing an encapsulated head of a foetus, according to the present invention.

In order to be able to manufacture a reproduction of an encapsulated head of a foetus, a series of steps are necessary to achieve this. The method described in FIG. 1 is the general steps of the method, however, changes in equipment could lead to changes in the number of steps necessary. Steps A and H are always necessary.

In step A, a representation of the foetus head to be reproduced is obtained. Therefore, the result of this step is a digital representation or a series of representations. Such digital representation could be achieved from a large variety of means e.g. x-ray, ultrasound, CT, MRI or similar tissue and/or bone penetrating imaging means. Ultrasound is generally considered to be less harmful to the human body and therefore, in case ultrasound could be used it is used. Furthermore, it is possible to use representations that are obtained from printed material, videotape or similar sources that are digitalized, although this is considered to be an indirect route, which is highly dependent on the resolution quality of the source.

If the object in question is not previously known there is obviously no three-dimensional model to merge with the digital representation. Thus, in this case the representation obtained in step A and B must be sufficient for generating a full three-dimensional model, suitable for the manufacturing machine in step H. However, if it is not possible in the steps A and B to achieve the necessary representation, the steps between B and step G should be an analysis of what part of the object must be made, in order to be able to perform step H manufacturing of the object as a physical three-dimensional object.

Step B concerns the case where only a smaller part of the foetus head are of interest or a large number of representations are available and the most relevant are to be selected. In this case it is necessary to choose the specific representation best suited for the reproduction of the foetus head. If only one representation is available or the optimal representation is directly obtainable, step B may be a straightforward process.

Having obtained the digital representation, step C concerns the manipulation of the material. If e.g. a picture is obtained by ultrasound the representation of the object is typically a two-dimensional representation.

When a two-dimensional representation is obtained in step A-B, the next step, C, is used for calculating depth values using the variation in the colour, contrast and/or brightness intensity. In order to derive depth parameters the representation is interpreted using a computer and software e.g. Free Former or Facegen. The interpretation needed is a depth value for the pixels in the representation according to the colour or intensity. E.g. the darker the pixel, the farther it is placed in the background or the farther it is placed from the viewpoint of the representation. However, advantageously the intensity of a sole pixel is set in relation to the neighbouring pixels, where brighter pixels are closer to the viewpoint while darker are farther away. This results in the ability to identify local changes in the depth values The interpretation could also be an interpolation of a series of points in relation to each other and thereby obtaining a vector or a slope of a curve in each point.

It may also be possible to obtain three-dimensional or four-dimensional representations, where the fourth dimension is time. These representations need only to be interpreted into a language suitable for the manufacturing machine in step H.

Therefore, the manipulation of the representation in step C to F has the aim of enhancing the details of areas of particular interest and ensuring that the representation is fully compatible, step G, to the manufacturing machine, step H.

In step H the encapsulated head of a fetus is reproduced. Such a reproduction could advantageously be carried out utilizing rapid prototyping techniques such as stereolithography, fused deposit modelling, drop deposit printing, laser sintering or similar. The reproduction process could also be carried out on various CNC-equipment.

It is important to notice that a three-dimensional ultrasound scan not necessarily results in a three-dimensional representation of the foetus head. Nonetheless, the third dimension may be derivable from the colours and the intensity of the colours. In the present method this derivation is carried out in step C.

Three-dimensional or four-dimensional ultrasound equipment is more complex and more expensive than the conventional two-dimensional ultrasound equipment and therefore it is important that the method may also be adapted for the use of two-dimensional ultrasound equipment.

The steps B to G could be more or less integrated into the machinery respectively performing step A or H e.g. if a computer aided design and manipulation system was build into the reproduction facility.

Figure 2:
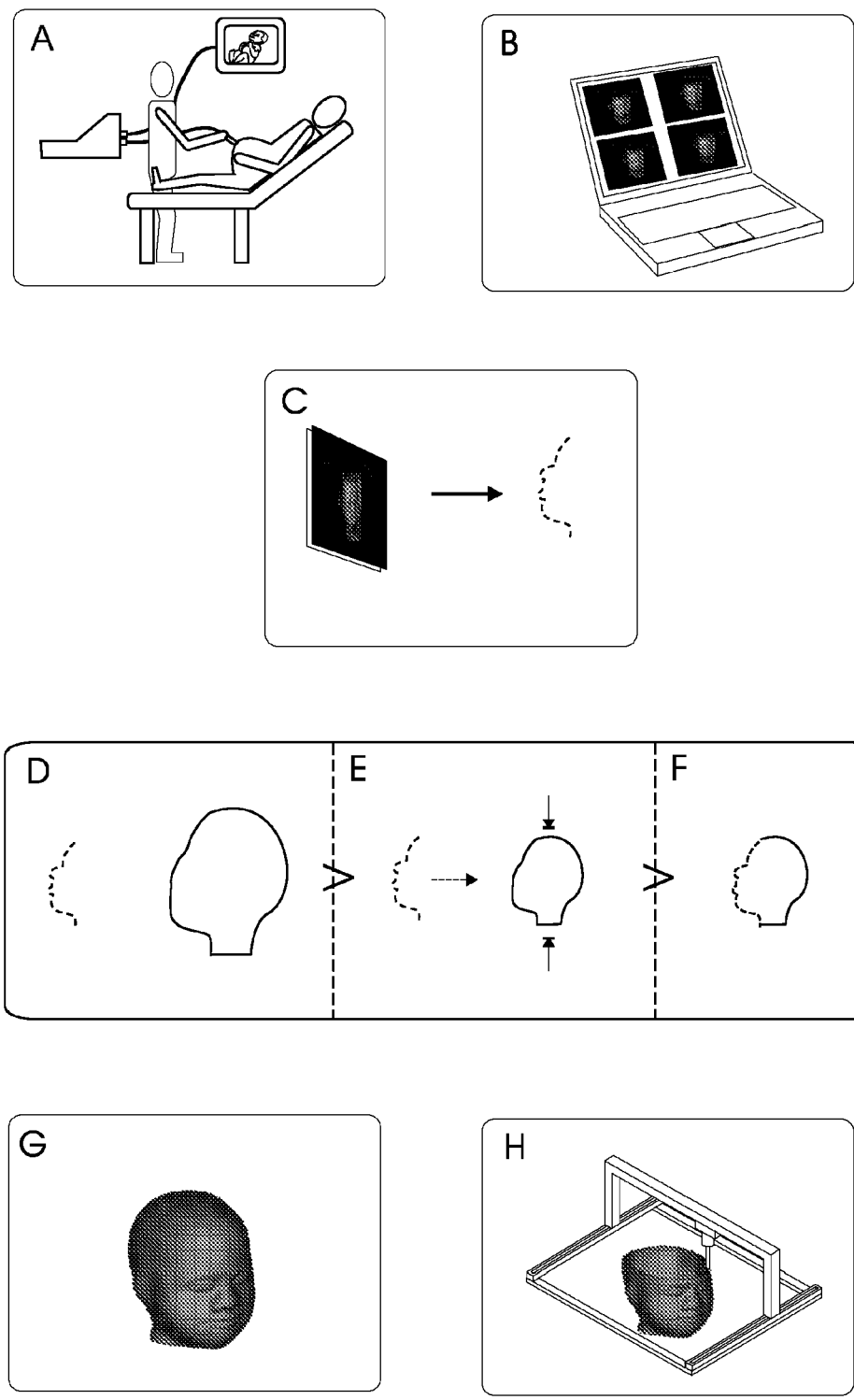
FIG. 2 shows the method of FIG. 1 in the particular case where the object to be reproduced is a head of a foetus.

FIG. 2 shows the steps A-H of FIG. 1 in the particular case of reproducing the head of a foetus.

In step A the two-dimensional representation of the foetus is obtained using a three-dimensional ultrasound scanner. A series of representations are obtained and in step B the best suited for the purpose of reproducing the expression of the face of the foetus are chosen. Such representations could e.g. be obtained using GE Voluson 730 Pro or Phillips HDI 4000 systems.

In order to handle the representations from said ultrasound systems, simple programs such as Photoshop, Corel for handling pictures are used. Using these programs the representations are cropped and scaled in relation to each other. The scaling could be necessary if the representations are obtained from altering distances of the head of the foetus. Such alterations of the distance are likely to occur, because the foetus is often physically active and moving.

Thus, a part of the manipulation carried out in step C is a scaling necessary in order later to combine the pictures to one single representation. Furthermore, dimensions of the object are derived.

Furthermore, in step C the depth dimension is obtained from the changes in the colour and colour intensity. This process is described in further detail in relation to FIG. 1.

In step D an anatomical model, which represent the expected best fit of the head of the ultrasound scanned foetus, is chosen from a database. In the three-dimensional digital environment the manipulated representation obtained in step C is placed in front of said anatomical model. The term "in front" and "behind" is considered in the context of working in in a three-dimensional computer aided design environment. Thus, it is natural during work to turn and rotate the objects in order to achieve the best possible working conditions.

In step E the anatomical model of the foetus head is scaled in order to combine the manipulated representation and the anatomical model to select the best fit. The anatomical models are grouped in e.g. African, Asian, European or similar archetypes. According to the size of the foetus the anatomical model need modifying to be adapted to the size of the foetus.

In step F the scaled anatomical model and the manipulated representation are combined. This is carried out in order to achieve a full three dimensional representation. The full three-dimensional representation thereby depicts both the specific head of the foetus in question and also the back of the head. Thus, with this full digital three-dimensional model it is now possible to generate the data needed for creating a physical three-dimensional reproduction.

Combining the anatomical model and the manipulated representation the details of the manipulated representation is the master shape and the anatomical model is either adapted accordingly to the manipulated representation or left unchanged. If the manipulated representation in an area defines a concave outline e.g. an eye socket that would result in an impression in the anatomical model, the anatomical model is shaped according to this concave outline. The anatomical model is said to be soft. When the manipulated representation defines a convex outline e.g. a cheekbone or the nose the anatomical model is left in its original size, which could result in a cavity between the anatomical model and the manipulated representation. Because the method of the present invention handles such cavity there is no need for the operator to spend valuable time in correcting this issue.

It also is possible to generate this full three-dimensional model solely from a set of digital representations obtained in step A. However, in the case of a living foetus it will be difficult to ensure that the foetus in all representations are positioned in a way that makes it possible to merge the obtained representations.

In step G the data of the full three-dimensional representation is exported to the manufacturing machine. In this step the data could be stl-, iges-, step-, or similar formats. If the machine for producing the physical three-dimensional reproduction is of the type using layer by layer, the data exported to the machine would be converted into multiple layers that together form the full digital three-dimensional model of the object. A file containing multiple layers are often considered to be a two-dimensional layer file although the thickness of the layers in fact represents a third dimension. However, this layer thickness is fixed according to the desired level of detail and speed of manufacturing of the object. Therefore, the layer thickness is disregarded when defining the number of dimensions.

In step H the physical reproduction of the object is carried out. Typically, a rapid prototyping (RPT), rapid manufacturing (RM) or general CNC equipment are used. As an example 3D-systems Viper pro SLA or SLS machine. Furthermore, an EOS laser sinter machine or Objet Polyjet machine. As an example of a CNC machine a Hermle CNC milling machine could be used.

The use of the method according to the present invention facilitates a quick and cheap reproduction of a foetus head encapsulated in a human body. The foetus head to be reproduced could be of all sizes mainly limited by the machinery for reproducing the physical three-dimensional reproduction.

What is claimed is:

1. A method for manufacturing a reproduction of a foetus head which comprises:
    obtaining at least one digital two-dimensional representation of the foetus head;
    manipulating the two-dimensional representation which comprises deriving depth parameters from the two-dimensional representation,
    selecting an encapsulated foetus head,
    designating a predefined digital three-dimensional representation that resembles the encapsulated foetus head,
    placing the predefined digital three-dimensional representation in the background of the manipulated two-dimensional representation from which the depth parameters have already been derived from a single two-dimensional representation,
    scaling and modifying the predefined digital three-dimensional representation in accordance with the two-dimensional representation,
    combining the scaled predefined digital three-dimensional representation with the manipulated two-dimensional representation to a full three-dimensional digital representation,
    converting the full three-dimensional representation to input-data for a manufacturing machine, and
    manufacturing a reproduction of the encapsulated foetus head as a physical three-dimensional model based on the input data.

2. The method of claim 1 wherein the foetus head to be reproduced is reproduced without first creating an initial model of the foetus head.

3. The method of claim 1 wherein the foetus head to be reproduced is encapsulated in a human body.

4. The method of claim 1 wherein the manufacturing of the foetus head is carried out by a rapid manufacturing or rapid prototyping process.

5. The method of claim 1 wherein the two-dimensional representation is obtained using ultra-sound, CT, MRI or X-ray.

6. The method of claim 1 wherein the two-dimensional representation is in the form of a physical illustration, image, photograph, or printout of a screenshot.

7. The method of claim 1 wherein the two-dimensional representations are converted into digital form.

8. A method for manufacturing a reproduction of a foetus head which comprises:
    obtaining at least one digital two-dimensional representation of the foetus head using ultra-sound, CT, MRI or X-ray techniques;
    manipulating the two-dimensional representation by deriving depth parameters from the two-dimensional representation,
    designating a predefined digital three-dimensional representation that resembles an encapsulated foetus head,
    placing the predefined digital three-dimensional representation in the background of the manipulated two-dimensional representation from which the depth parameters have already been derived from a single two-dimensional representation,
    scaling and modifying the predefined digital three-dimensional representation in accordance with the two-dimensional representation,
    combining the scaled predefined digital three-dimensional representation with the manipulated two-dimensional representation to a full three-dimensional digital representation,
    converting the full three-dimensional representation to input-data for a manufacturing machine, and
    manufacturing a reproduction of the encapsulated foetus head as a physical three-dimensional model based on the input data;
    wherein the foetus head to be reproduced is reproduced without first creating an initial model of the foetus head.

9. The method of claim 8, wherein the two-dimensional representations are converted into digital form and wherein the manipulating of the two-dimensional representation is performed using a three-dimensional computer environment provided by a three-dimensional computer aided design program.

10. The method of claim 9, which further comprises obtaining at least part of the three-dimensional representation directly from a computer database of anatomical models.

* * * * *